United States Patent [19]

Tsutsumi

[11] Patent Number: 4,976,900

[45] Date of Patent: Dec. 11, 1990

[54] METHOD AND APPARATUS FOR GUSHING AIR STREAM INTO METAL MOLDS IN INJECTION MOLDING MACHINE

[75] Inventor: Shigeru Tsutsumi, Tokyo, Japan

[73] Assignee: Sanri Kabushiki Kaisha, Tokyo, Japan

[21] Appl. No.: 244,960

[22] Filed: Sep. 15, 1988

[30] Foreign Application Priority Data

Sep. 18, 1987 [JP] Japan .................................. 62-232402

[51] Int. Cl.⁵ .............................................. B29C 45/72
[52] U.S. Cl. .................................. 264/39; 264/328.14; 264/328.16; 264/335; 264/336; 425/547; 425/552; 425/437
[58] Field of Search ........................ 264/39, 79, 328.1, 328.14–328.16, 264/335, 336; 425/547–549, 552, 437; 249/79

[56] References Cited

U.S. PATENT DOCUMENTS

| | | | |
|---|---|---|---|
| 3,128,499 | 4/1964 | Smolenski | 425/225 |
| 3,645,319 | 2/1972 | Pondelicek et al. | 264/39 |
| 3,805,875 | 4/1974 | Daugherty et al. | 425/437 |
| 4,151,236 | 4/1979 | Ryder | 264/39 |
| 4,164,523 | 8/1979 | Hanning | 264/335 |
| 4,687,613 | 8/1987 | Tsutsumi | 264/328.15 |
| 4,707,309 | 11/1987 | Voss et al. | 425/107 |

*Primary Examiner*—Jill L. Heitbrink
*Attorney, Agent, or Firm*—Dykema Gossett

[57] ABSTRACT

A method and an apparatus for injecting a steam into a mold in an injection molding machine by injecting a desired stream toward the opening of the metal mold including a gate and cavities in connection with the opening and closing operation of the metal mold thereby intending the cooling solidification of the molten resin on th gate portion and simultaneously intending removal of dewing and an oily matter on the surface of the metal mold.

15 Claims, 8 Drawing Sheets

1 : Stationary metal mold
2 : Gate
3 : Movable metal mold
4 : Cavity
9 : Molten resin passageway
10,13 : Stream-passing hole
11,14 : Air-passing pipe
12 : Stream controller Y-Y cross section

METHOD AND APPARATUS FOR GUSHING AIR STREAM INTO METAL MOLDS IN INJECTION MOLDING MACHINE

BACKGROUND OF THE INVENTION

1. Field of the Invention

The present invention relates to a method and apparatus for gushing an air stream into a metal mold in an injection molding machine for the purpose of molding of a hot-molten substance, especially a synthetic resin.

2. Description of the Prior Art

The components and structure of synthetic resin injection molding machines have been developed for the purpose of high speed molding because of a demand for high speed molding in addition to precise molding.

Although various machine manufactures have simultaneously made an effort toward the research and development of injection molding machines for the purpose of the structural improvement from the standpoints of several functions such as resin-melting ability, resin injectability into a cavity and metal molding-cooling ability, satisfactory high speed molding have not been achieved till now because of restriction on the above respects.

When the gate is opened in the case of runnerless injection molding, for example, there may sometimes offer inconvenience of leakage of the molten resin such a drip of the molten resin as a "pendulous efflux" and a "string pulling" phenomenon. However, satisfactory high-speed molding is very difficult for all resins, even if cooling solidification of the resin or the gate portion, namely maintenance of the gate in a clogged state compulsatorily inhibits leakage of the molten resin to perform rapid opening and closing operations of the metal molding in order to prevent the above phenomena.

Because high-viscose styrol resins can achieve complete high-speed molding inspite of a material, which relatively less likely produce a pendulous efflux of the resin and the strain pulling phenomenon on the gate, the opening and closing speeds are delicately adjusted for each time according to the viscosity and the molding temperature of the resin and the size and shape of the molding.

Conventional injection molding machines have raised a problem in that efficient and effective molding can be made because of a pendulous efflux and a string pulling of the molten and semi-molten resin on the gate portion regardless of the intention of improvement in the mechanical properties in the case of high speed molding.

SUMMARY OF THE INVENTION

In order to solve the above-described problems, it is an object of the present invention to provide a method and an apparatus for injecting a stream into a mold in an injection molding machine by injecting a desired stream toward the opening of the metal mold including a gate and cavities in connection with the opening and closing operation of the metal mold thereby intending the cooling solidification of the molten resin on the gate portion and simultaneously intending removal of dewing and an oily matter on the surface of the metal mold.

It is another object of the present invention to provide a method and an apparatus for injecting the above stream into the metal mold in an injection molding machine which enables scattering of a mold releasing agent instead of the stream injecting into the opening surface of the metal mold.

When a desired stream is injected into the opening of the metal mold with relative to the opening and closing operations of the metal mold, the stream is acted on the entire resin-molding situation including the cavities as well as the gate to form local current space to close the gate by means of rapid cooling solidification of the molten resin on the gate portion, thereby preventing an inconvenience of leakage of the molten resin such as a pendulous efflux and strain pulling and, in addition, instantly blowing off the dew drop and oily material on the opening of the metal mold to produce a continuously cleaned clear metal opening during injection of the stream.

Accordingly, shortening of the molding cycle, or high speed molding can be intended in which the metal mold is closed again after removal of the molding and the subsequent molding is performed and the molded product can be molded under a clean environment at any times.

Figure 4:
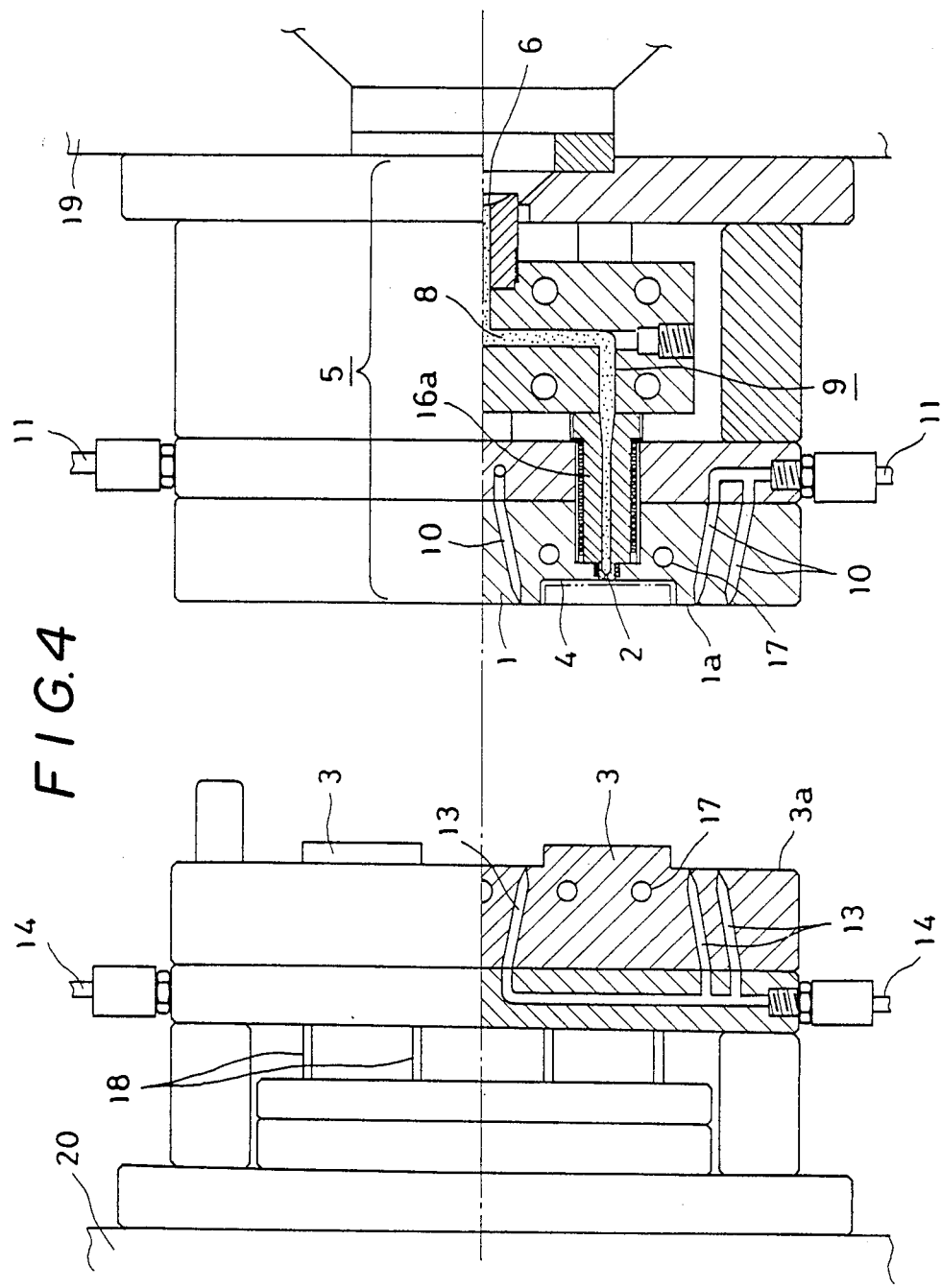
Figure 5:
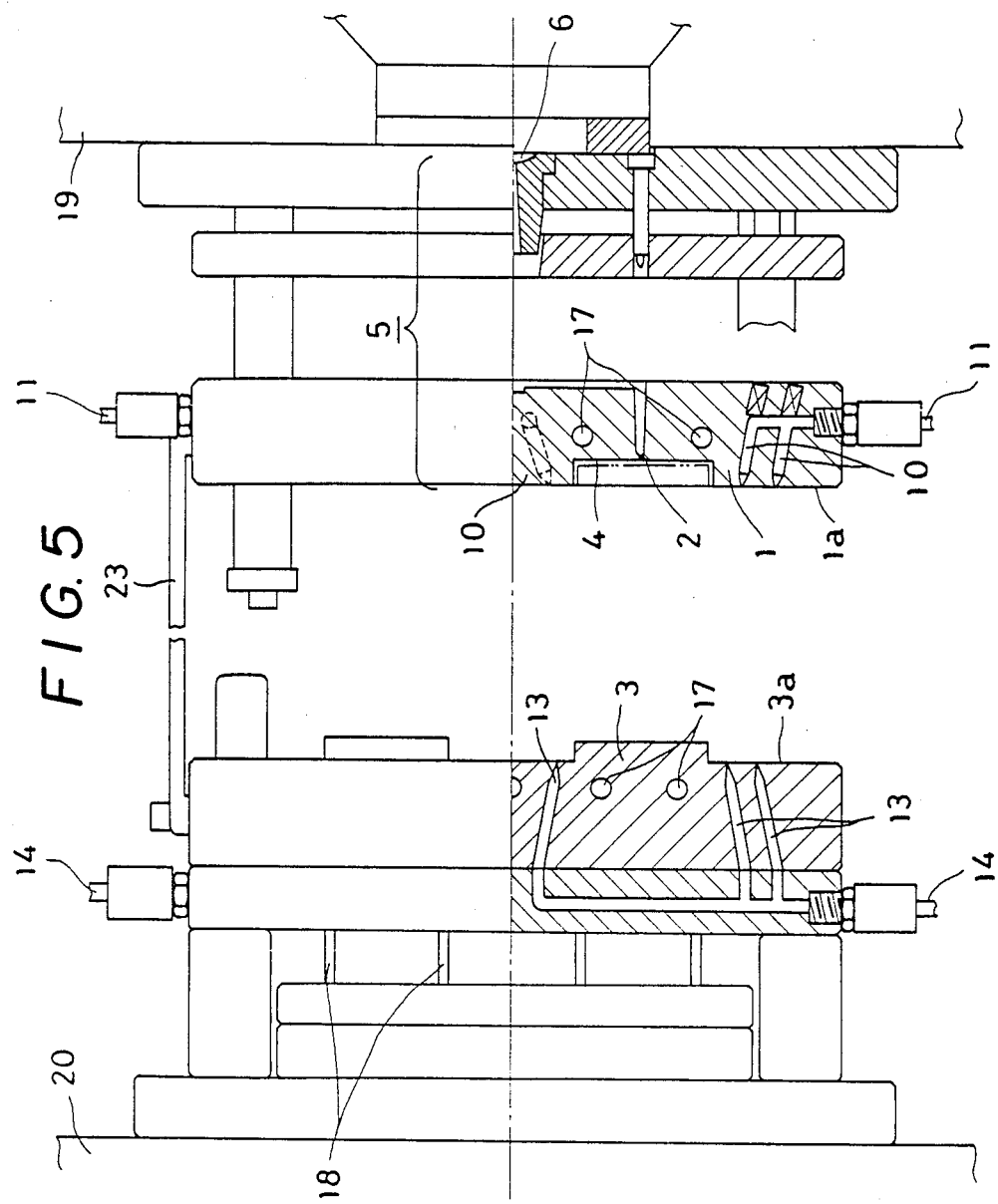
Figure 6:
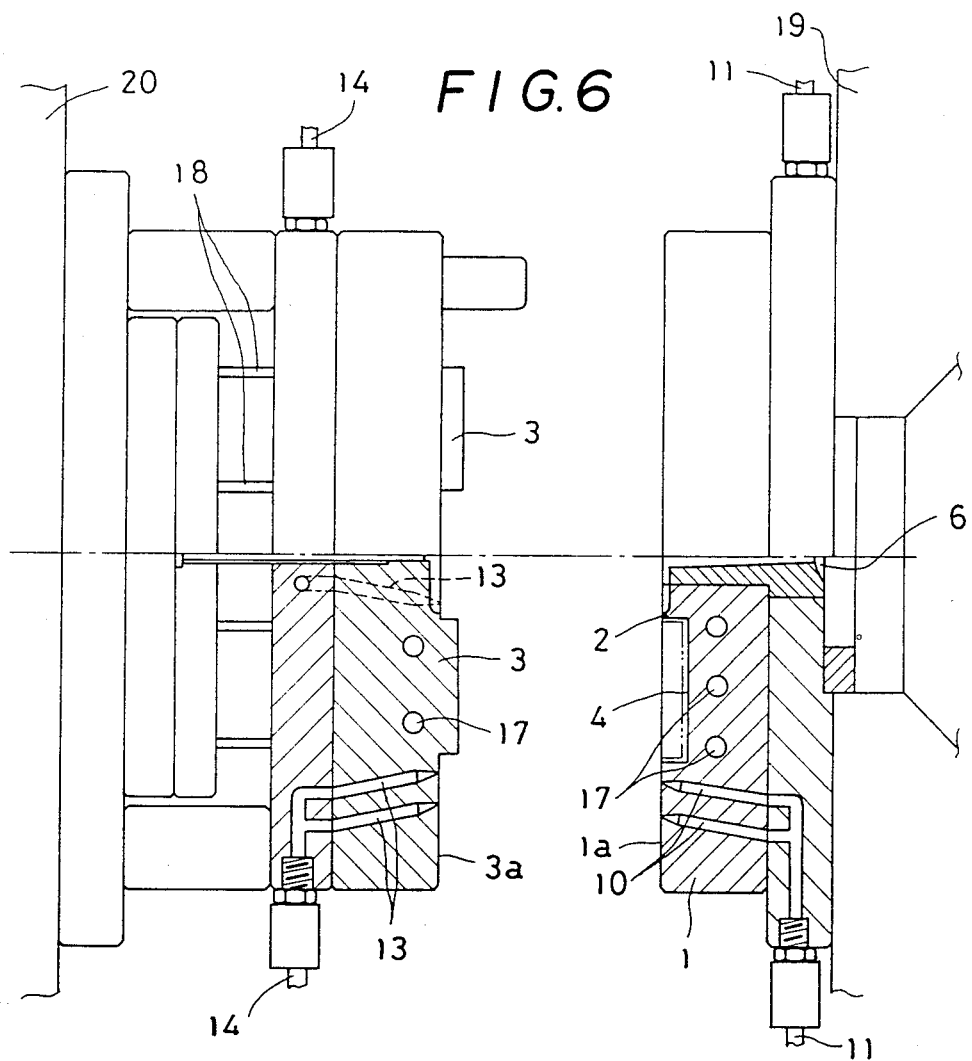

All of FIGS. 4, 5 and 6 are main portion partially cutaway side view of other three embodiments in the present invention.

Figure 7:
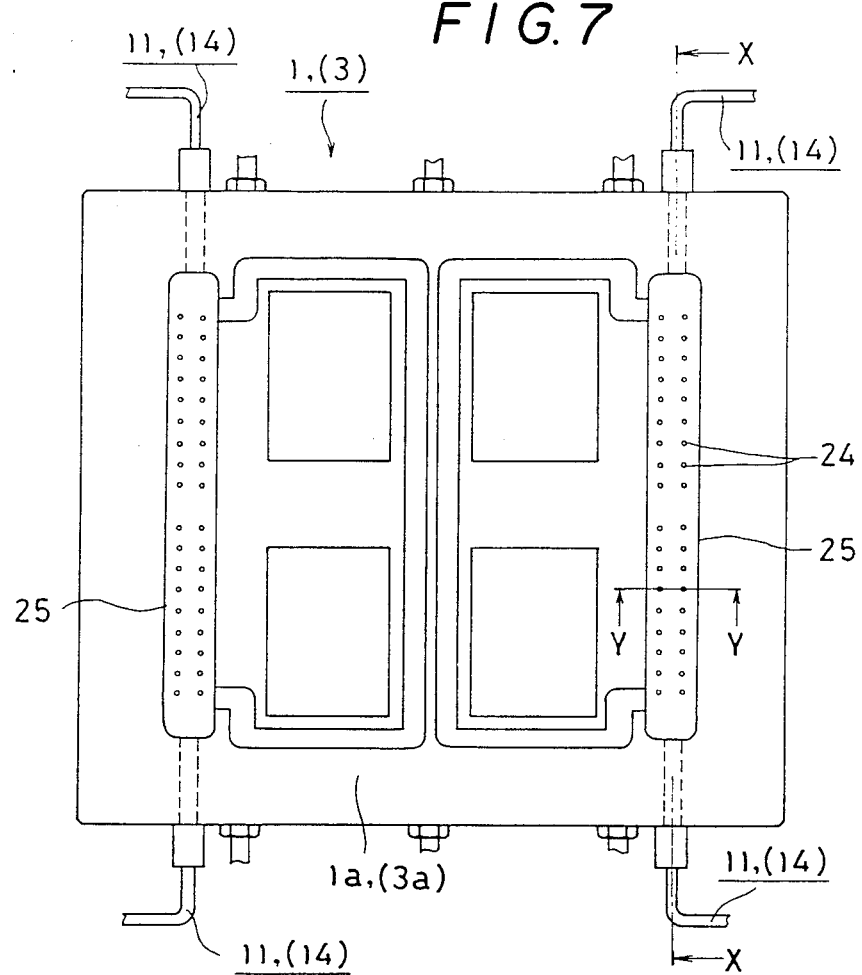
Figure 8:
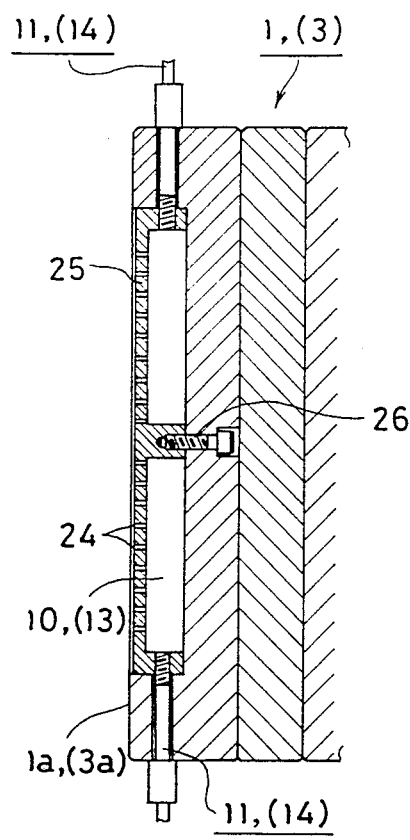
Figure 9:
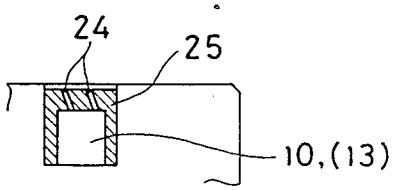

FIGS. 7, 8 and 9 illustrate one embodiment of the stream-gushing structure; wherein FIG. 7 is a frontal view thereof, FIG. 8 is a cross-sectional view taken along a line X—X thereof, FIG. 9 is a cross-sectional view taken along a line Y—Y of FIG. 7.

1: Stationary metal mold with gate 2 opened
3: Movable metal mold; 4: Cavity
10 and 13: Stream-passing holes;
11 and 14: Air-passing pipes;
12: Stream controller
15: Valve mechanism;
24: Gushing hole
25: Cover

DETAILED DESCRIPTION OF THE PREFERRED EMBODIMENT

An embodiment of an apparatus in the present invention is described relating to the synthetic resin injection molding machine illustrated in the drawings.

One embodiment provided with the basic structure is described with reference to FIG. 1 to 3.

Both of a stationary metal mold 1 in which the gate 2 is opened and a movable metal mold 3 which is brought into contact with and separated from the stationary metal mold in an opposed relation with each other forms a desired cavity 4. The metal molds are provided with two sets of molding portions top and bottom. A numeral 5 denotes a plural number of metal mold groups superimposed on the rear portion of the stationary metal mold. A molten resin passageway 9 composed of a runner 7 and a manifold branch hole 8 is bored between the cavity 4 and a nozzle touchment 6.

A stream-passing hole 10 with a nozzle portion opened on a metal mold opening surface 1a in the vicinity of the respective cavities 4 of the stationary metal mold 1 is bored in an inclined manner with the stream-passing hole having three branched portions. Two air-passing pipes 11 connected to the openings of both end portions of the stream-passing holes 10 are connected to a stream controller 12 including a stream generator and temperature control.

Similarly a stream-passing hole 13 with a nozzle portion opened on a metal mold opening surface 3a in the vicinity of the respective cavities 4 formed on the movable metal mold 3 is bored in an inclined manner with the stream-passing hole 13 having three branched portions. Two air-passing pipes 14 are connected to the openings of both end portions of the metal mold and further connected to the stream controller 12. A valve mechanism 15 is connected to the air-passing pipes 11 and 13 thereby enabling adjustment of the flow rate of the stream in the pipes 11 and 13 or opening and closing of the passway.

A hot runner body 16 serving as an external heating means is vertically mounted on the runner portion 7 of the passageway 9 to act as a so-called hot runner injection molding mechanism.

In the drawings, numerals 17, 18, 19 and 20 denote a cooling water hole, a molding-extruding pin, a fixed die plate, and a movable die plate, respectively.

In view of the structure, a method for injecting a gas stream into the metal molds 1 and 3 in the synthetic resin injection molding machine is described below.

Figure 1:
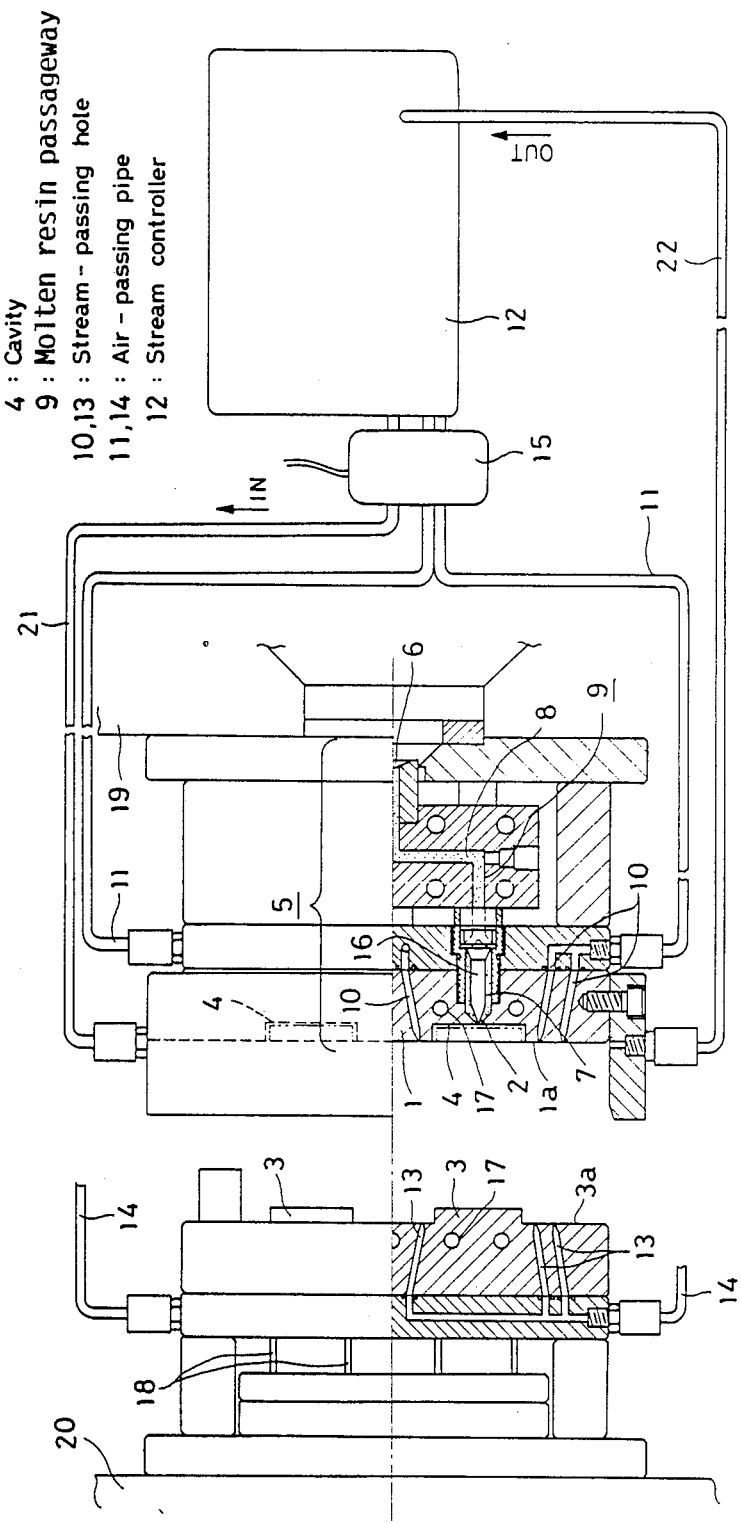
FIGS. 1 to 3 are main portion cut-away side explanatory diagram showing one embodiment of a stream gushing apparatus into a metal mold in a synthetic resin injection molding machine related to the present invention.
Figure 2:
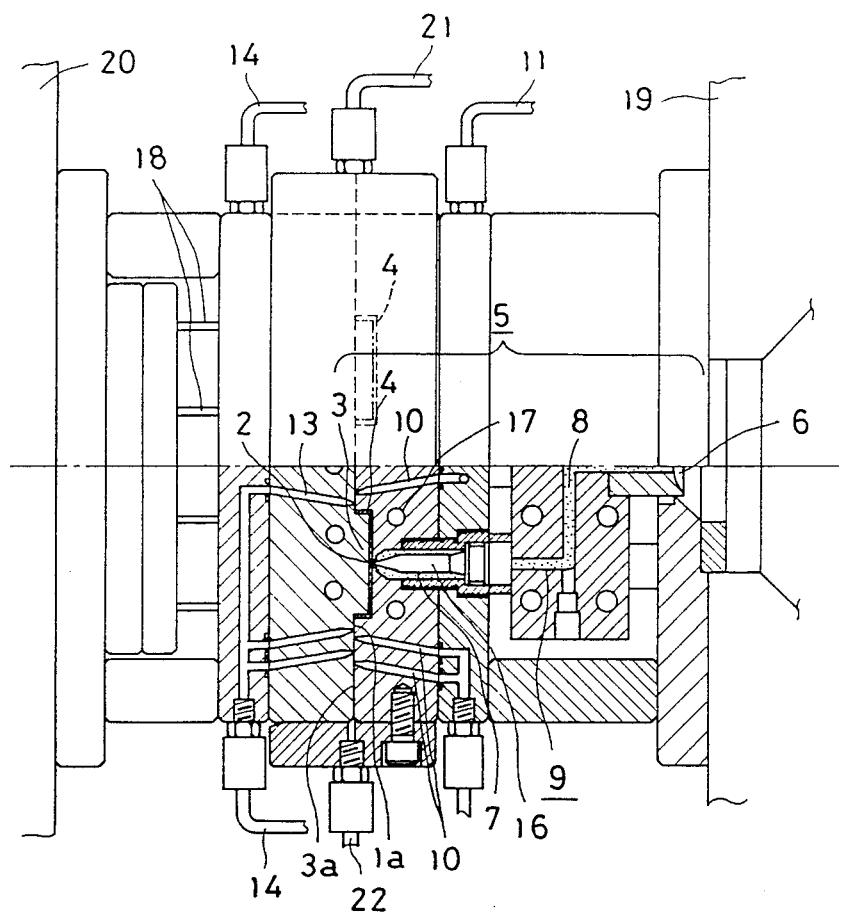
Figure 3:
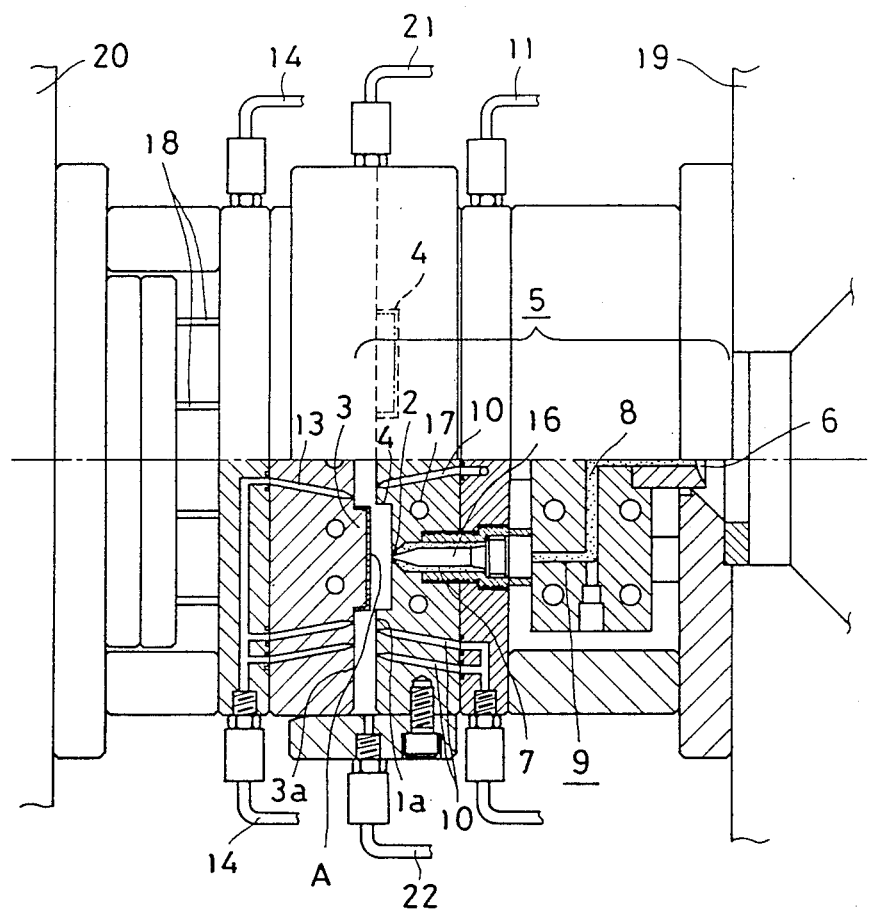

A molten resin is introduced from the nozzle touchment 6 into the metal mold group 5 through injection means (not shown) in which a mold opened state with the metal molds 1 and 3 in FIG. 1 opened is converted into a mold-compacting state in FIG. 2. A desired amount of the molten resin is injected into and fills the cavities 4 from the gate 2 through the passageway 9. After passage of a desired time, a mold-opening operation is conducted and a molding A is removed from the movable metal mold 3 by means of a molding-removing pin 18 after the mold-opening state has changed into an intermediate partly open state as shown in FIG. 3.

The resin molding operation is repeatedly continued when the mold-opening state shown in FIG. 1 is changed into the state as shown in FIG. 2.

In a series of the above described resin molding cycle, the stream supplied by the stream controller 12 reaches inside the stream-passing holes 10 and 13 of the metal molds 1 and 3 via the air-passing pipe 14 thereby being capable of gushing from the nozzle portion. In such a construction, a necessary quantity of the stream is gushed onto the metal mold surfaces 1a and 3a via the respective nozzle portions of the stream passing holes 10 and 13 because, although the nozzle portions are closed to prevent the stream from gushing when both metal molds 1 and 3 are in a mold-compacting state as shown in FIG. 2, both of the metal molds 1 and 3 displays a valve-like action when the metal molds are slightly opened.

Because the nozzle portion is directed toward the gate 2 of the stationary metal mold 1 at the same time of mold-opening, the stream gushed from the air-passing hole 13 of the movable metal mold 3 effectively cools the gate portion 2 to form the thin-layered film skin layer of the molten resin on the opening surface of the gate thereby preventing a so-called pendulous efflux phenomenon caused by dipping of the molten synthetic resin, through the gate, from the surface 1a and a strain-pulling phenomenon in which the molten resin from the gate 2 exhibits a condition resembling string-pulling.

The stream gushed from the stream-passing hole 10 facing the surface of the stationary metal mold 1 can effectively conduct direct cooling to a molding, such that a molding A can rapidly be removed The stream-gushing action from the metal molds 2 and 3 efficiently blows off the dewed moisture on the metal mold opening surfaces 1a and 3a of the metal molds 1 and 3 and oily matter resulted from the plasticizer in the molten resin thereby always enabling the maintenance of the cleaned state.

Because the stream acted on the gate 2 effectively cools the gate portion at the same time of mold-opening even by accelerating the change from the mold-compacting state to the mold-opening state, the cooling solidification of the molten resin is promoted, the time for removing the molding is made earlier and the subsequent molding operation can be performed whereby one molding operation time is remarkably shortened to enable so-called high speed molding.

In the embodiment shown by the drawings, the air-passing pipe 21 in which the stream is acted between the metal mold opening surfaces 1a and 3a is connected to one side portion of the stationary metal mold 1 and an aspirating pipe 22 for aspirating the stream is connected to another side portion, the air-passing pipe 21 and the aspirating pipe being connected to the stream controller 12, respectively whereby the method adds a structure in which the method can be used in combination with the air gashing method by which the stream is acted on the metal mold opening surfaces 1a and 3a.

Although there is a time in which the metal molds 1 and as well as the gate 2 has not reached a temperature necessary for molding in the initial or, rising stage of the gushing molding operation in the present invention, the apparatus can be operated by detecting such the situation producing a stream with the temperature being elevated above a necessary temperature, or warm to hot wind, in the stream controller 12 either automatically or manually, and effectively gushing from the respective stream-passing holes 10 and 13, via the nozzle portion onto the respective metal mold opening surfaces 1a and 3a through the intermediary of the respective air-passing pipes 11 and 14 whereby normal operating conditions can be produced for a period as short as possible.

The structure of the emobodiment given in FIG. 4 is described below. In the drawing, only the main portions of the embodiment are described with portions in common with the above described embodiment being omitted.

The embodiment is quite the same as the above-described embodiment with regard to the structures of the stationary metal and mold 1, the movable metal and mold 3, the gate 2, the cavity 4, the stream-passing holes 10 and 13, and the air-passing pipes 11 and 14. The stream controller and the valve mechanism which is not shown in the drawing is also the same as the above.

The only difference from the above-described embodiment is a structure in which a hot runner body 16a mounted on the runner portion 7 is used as a center hole-opened internal heating means.

Accordingly, a method for topically or centrally gushing a stream onto the metal mold opening surfaces 1a and 3a is omitted from the detailed description because of being quite the same as that of the above-described embodiment.

In the drawing, portions the same as or corresponding to the above-described embodiment are denoted by the identical codes.

Still another embodiment is described with reference to FIGS. 5 and 6.

Both of the above-described two embodiments give so-called a sprue runner method in which, the resin in the runner portion 7 is solidified to form a molding. The structure given in FIG. 5 is such that an arm rod 23 interlocking with the movable metal mold 3 is provided for removing the solidified sprue resin in the molten resin passageway 9 of the stationary metal mold 1 whereby the sprue resin can be removed by releasing the same together with the molding.

The embodiment illustrated in FIG. 6 gives a structure in which the sprue resin can be removed, by mold-opening operation together with the molding by means of molding-extruding pins 18.

The basic structures of the metal molds 1 and 3, and the cavity 4, the gate 2, the stream-passing holes 10 and 13, and the air-passing pipes 11 and 14 are the same as those in the above-described embodiment and are connected to the stream controller and the valve mechanism which, are the same as those in the above-described embodiment which are not shown in drawings.

An embodiment illustrated in FIGS. 7 to 9 is described.

The embodiment gives a stream-gushing structure provided on the stationary metal mold 1 or a movable metal mold 3. Longitudinal covers 25, in which a large number of gushing holes 24 are parallelly arranged, corresponding to the nozzle portion are secured to both ends of four, composed of two pairs, male of female molds. The inside of the covers 25 is provided with the stream passing holes 10 or 13 and the air-passing pipes 11 or 14 are connected to the upper portions and lower portions of the respective covers 25, whereby the stream can be gushed toward the opposed metal opening surfaces 1a and 3a.

The respective paired covers 25 can be secured to both sides of the metal mold 1 or 3 using screw pins 26 from the rear side thereof.

Accordingly, stream gushing in the above-described respective embodiments using the metal molds 1 and 1a in the above structure can effectively perform high speed molding similar to that described above.

The stream used herein is preferably dehumidified dry air in general but other gases, such as an inert gas may be used.

In addition, a suitable switching device may be incorporated in the structure for scattering a releasing agent such that the internal of the metal mold can always be maintained in an adequate releasing condition. For example, gushing of the stream may intermittently switched into scattering of the releasing agent at a regular interval.

Although the above embodiments are exemplified by a synthetic resin used for the hot-molten substance, they can be doubtlessly applied to other substances of the same effectiveness similar to those of the above.

The present invention can rapidly perform molding and operation of a hot-molten substance irrespective of the size of the gate only through a current gushing means which directs the metal mold portion, more particular the metal mold opening surface thereby enabling an ultra high speed molding operation for a short period of time, e.g., two to three seconds. In addition, the present invention can display cleaning effectiveness in cases of such as cooling and heating of the gate, removal of an oily waste on the metal mold opening surface and blowing off of dew drops.

In other words, the surface temperature of the molded product is rapidly lowered to promote hardening, such that the molding cycle can further be shortened.

Conventionally, even if the metal mold is opened earlier for the purpose of shortening of the molding cycle, the surface of the molded product tends to be injured because the surface temperature thereof remains high, so that the product had to be removed slowly from the metal mold by means of a removing machine. However, the present invention causes the surface temperature of the molded product to rapidly lower by means of the stream gushing of cooled when it is removed from the metal mold. Accordingly, no injury on the molded product is observed when it is freely fallen from the metal mold because it has already been hardened sufficiently.

For this reason, the present invention displays an effect that the molding cycle can further be shortened by a period required for the use of the removing machine (about two seconds).

There is no inconvenience caused by high-speed molding because an uneven row of the molded product due to free falling can automatically corrected after falling using a row-correcting machine.

Because the stream blowing-upon portion is automatically opened and closed by virtue of the opening and closing operation of the metal mold, any special construction of opening and closing of the stream valve is not necessary. In such a way, the whole construction can be simplified thereby enabling provision of the moldings at a low cost.

In addition, the structure is capable of optional scattering by switching the releasing agent in a manner quite the same as blowing-upon of the stream, so that any new structure need not be added thereto for scattering of the releasing agent and the molding can be provided at low cost only by using concurrently employed means and simple switching means.

There is adverse effect relating to the quality of a molding responsible for different cooling speeds between the thick portion and the thin portion of general molded products with uneven thickness (such as camber and defect). In the present invention, air gushing is locally and concentratedly performed from the thin portion to the thick portion, such that delayed cooling is restored to enable uniform cooling as a whole, whereby a molded product of high quality can be obtained by omitting troublesome processing operation of variable positions of the cooling bore which is to be bored in conventional metal molds.

What is claimed is:

1. A method of injection molding, comprising the steps of:
   injecting a hot molten substance through a gate into a cavity defined by opposing surfaces of a metal mold, said metal mold being repeatedly opened and closed; and
   solidifying said hot molten substance by cooling, thereby yielding a molded article;
   wherein said method comprises the further step of gushing a stream of gas towards both said substance and both of said opposed surfaces of said metal mold each time each metal mold is opened, adequate to simultaneously aid cooling of said substance and remove dew and oily matter from said at least one mold surface by impingement of said gas;

said stream of gas is also gushed towards said gate, adequate to cool and solidify a portion of said substance facing said gate, thereby clogging said gate.

2. The method according to claim 1, wherein said stream of gas is a high-speed cool wind.

3. The method according to claim 1, wherein said gas includes a releasing agent scattered onto said at least one mold surface by said gushing of said stream.

4. The method according to claim 1, wherein said gushing step is carried out by passing said gas through a nozzle disposed opposite said at least one mold surface.

5. The method according to claim 4, wherein said passing of said gas through said nozzle is essentially continuous, interrupted only when said nozzle is closed by abutment against said least one opposed mold surface.

6. The method according to claim 1, wherein said gushing means scatters a releasing agent instead of said stream.

7. An injection molding machine comprising:
a mold adapted for repeated opening and closing, comprising a pair of opposed mold surfaces defining between them a mold cavity;
a gate allowing entry of a hot molten substance into said mold cavity, said substance being of the type adapted for solidification by cooling to yield a molded article; and
means gushing a stream of gas towards both said substrate in said cavity and both of said opposed surfaces of said mold each time said metal mold is opened, said gushing means supplying a stream of gas adequate to simultaneously aid cooling of said substance and remove dew and oily matter from said at least one mold surface by impingement of said gas;
said stream gushing means is adapted to additionally gush said stream towards said gate adequately to cool and solidify a portion of said substance facing said gate, thereby clogging said gate.

8. The device according to claim 7, wherein said stream gushing means provides a high-speed cool wind.

9. The device according to claim 7, wherein said gushing means comprises at least one nozzle disposed opposite said at least one of said opposing surfaces.

10. The device according to claim 9, wherein said at least one nozzle is carried in at least the other of said opposing mold surfaces.

11. The device according to claim 9, wherein said nozzle is adapted to be opened when said mold is opened and closed when said mold is closed.

12. The device according to claim 11, wherein said nozzle is adapted for closure by abutment against said at least one opposing mold surface.

13. The device according to claim 7, wherein said stream gushing means additionally scatters a releasing agent onto at least one of said opposing surface.

14. The device according to claim 13, further comprising switching means for supplying releasing agent to said stream.

15. The device according to claim 7, wherein said gushing means scatters a releasing agent instead of said stream.

* * * * *